US010180620B2

(12) United States Patent
Murashima et al.

(10) Patent No.: US 10,180,620 B2
(45) Date of Patent: Jan. 15, 2019

(54) POWER CONTROLLER AND POWER CONTROL METHOD

(71) Applicant: SONY CORPORATION, Tokyo (JP)

(72) Inventors: Nobuharu Murashima, Tokyo (JP); Yuki Hara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 15/544,378

(22) PCT Filed: Jan. 21, 2016

(86) PCT No.: PCT/JP2016/051652
§ 371 (c)(1),
(2) Date: Jul. 18, 2017

(87) PCT Pub. No.: WO2016/125587
PCT Pub. Date: Aug. 11, 2016

(65) Prior Publication Data
US 2018/0011387 A1 Jan. 11, 2018

(30) Foreign Application Priority Data
Feb. 3, 2015 (JP) .................. 2015-018922

(51) Int. Cl.
G03B 9/60 (2006.01)
G03B 5/00 (2006.01)
(Continued)

(52) U.S. Cl.
CPC .............. G03B 9/60 (2013.01); G03B 5/00 (2013.01); G03B 9/36 (2013.01); G06F 1/00 (2013.01);
(Continued)

(58) Field of Classification Search
CPC ................. H04N 5/23241; H04N 5/23267
See application file for complete search history.

(56) References Cited

U.S. PATENT DOCUMENTS 7,653,293 B2 * 1/2010 Masuda ............ H04N 5/23209
348/296
8,787,747 B1 * 7/2014 Naito ................ H04N 5/353
396/55

(Continued)

FOREIGN PATENT DOCUMENTS

JP 10-319461 A 12/1998
JP 11-119276 A 4/1999
(Continued)

OTHER PUBLICATIONS

Wahisu (JP 10-319461A), Optical Equipment, Dec. 4, 1998.*
International Search Report and Written Opinion of PCT Application No. PCT/JP2016/051652, dated Apr. 12, 2016, 02 pages of English Translation and 07 pages of ISRWO.

Primary Examiner — Clayton E Laballe
Assistant Examiner — Linda B Smith
(74) Attorney, Agent, or Firm — Chip Law Group

(57) ABSTRACT

The present technology relates to a power controller, a power control method, and a program which appropriately supply power to an actuator for driving a shutter and an actuator for camera shake correction. A power controller includes a shutter controller for controlling a shutter driving unit, a camera shake correction controller for controlling a camera shake correction driving unit, and a power amount setting unit for setting amounts of power to be allocated to the shutter driving unit and the camera shake correction driving unit according to a set shutter speed. The power amount setting unit allocates the amount of power to be supplied to the camera shake correction driving unit when the shutter speed is equal to or less than a predetermined speed to the shutter driving unit in a case where the shutter speed is faster than a predetermined speed. The present technology available for an image pickup device.

15 Claims, 14 Drawing Sheets

(51) Int. Cl.
  *G03B 9/36* (2006.01)
  *G06F 1/00* (2006.01)
  *H04N 5/232* (2006.01)
  *H04N 5/235* (2006.01)
  *H04N 5/238* (2006.01)
  *G03B 9/42* (2006.01)

(52) U.S. Cl.
  CPC ........... *H04N 5/238* (2013.01); *H04N 5/2353* (2013.01); *H04N 5/23241* (2013.01); *H04N 5/23248* (2013.01); *H04N 5/23267* (2013.01); *H04N 5/23287* (2013.01); *G03B 9/42* (2013.01); *G03B 2205/0007* (2013.01); *G03B 2205/0092* (2013.01); *G03B 2207/005* (2013.01); *G03B 2217/007* (2013.01)

(56) References Cited

U.S. PATENT DOCUMENTS

| | | | |
|---|---|---|---|
| 2007/0189745 A1* | 8/2007 | Masuda | H04N 5/23209 396/55 |
| 2008/0284873 A1* | 11/2008 | Miyanari | H04N 5/235 348/229.1 |

FOREIGN PATENT DOCUMENTS

| | | | |
|---|---|---|---|
| JP | 2003-179813 A | 6/2003 |
| JP | 2007-193155 A | 8/2007 |
| JP | 2007-221215 A | 8/2007 |

\* cited by examiner

FIG. 5

| SHUTTER SPEED (SECOND) | | LOW SPEED ~1/2000 | MEDIUM SPEED 1/2000 ~1/4000 | HIGH SPEED 1/4000 ~1/8000 |
|---|---|---|---|---|
| SHUTTER | FRONT CURTAIN | 350mW | 470mW | 0mW |
| | REAR CURTAIN | 350mW | 470mW | 940mW |
| CAMERA SHAKE | PITCH | 100mW | 20mW | 20mW |
| | YAW | 100mW | 20mW | 20mW |
| | ROLL | 100mW | 20mW | 20mW |

POWER CONTROLLER AND POWER CONTROL METHOD

CROSS REFERENCE TO RELATED APPLICATIONS

This application is a U.S. National Phase of International Patent Application No. PCT/JP2016/051652 filed on Jan. 21, 2016, which claims priority benefit of Japanese Patent Application No. JP 2015-018922 filed in the Japan Patent Office on Feb. 3, 2015. Each of the above-referenced applications is hereby incorporated herein by reference in its entirety.

TECHNICAL FIELD

The present technology relates to a power controller, a power control method, and a program. Specifically, the present technology relates to a power controller, a power control method, and a program which control power supply according to a shutter speed.

BACKGROUND ART

Regarding an image pickup device which images a still image and a moving image, when a user holds the image pickup device and images an image, distortion is generated in the imaged image due to camera shake by a user, and an image quality may be deteriorated. To reduce the deterioration in the image quality, camera shake correction has been proposed (for example, refer to Patent Document 1).

CITATION LIST

Patent Document

Patent Document 1: Japanese Patent Application Laid-Open No. 11-119276

SUMMARY OF THE INVENTION

Problems to be Solved by the Invention

In Patent Document 1, a movable lens moved by a motor is included. It has been proposed in Patent Document 1 that an effect caused by the camera shake is reduced by moving the movable lens. Since it is necessary to drive the motor, power to drive the motor is required. However, for an image pickup device, it has been desired to reduce power.

The present technology has been made in consideration of this situation, and the present technology can accurately perform camera shake correction and can reduce power.

Solutions to Problems

A power controller according to one aspect of the present technology includes a shutter controller for controlling a shutter driving unit, a camera shake correction controller for controlling a camera shake correction driving unit, and a power amount setting unit for setting power amounts to be allocated to the shutter driving unit and the camera shake correction driving unit according to a set shutter speed.

In a case where the shutter speed is faster than a predetermined speed, the power amount setting unit can allocate an amount of power to be supplied to the camera shake correction driving unit when the shutter speed is equal to or less than the predetermined speed to the shutter driving unit.

In a case where the shutter speed is faster than a predetermined speed, the power amount setting unit can allocate an amount of power necessary to maintain a state where the camera shake correction driving unit is held to the camera shake correction driving unit.

The power amount setting unit can change a voltage to be applied to the shutter driving unit according to the shutter speed.

When the shutter speed is high, the power amount setting unit can increase the voltage to be applied to the shutter driving unit.

The shutter can be a focal plane shutter.

The shutter can include a front curtain and a rear curtain.

The front curtain of the shutter can be an electronic shutter or a mechanical shutter, and the rear curtain can be a mechanical shutter.

In a case where the shutter speed is faster than a predetermined speed, the power amount setting unit can add an amount of power to be allocated to the front curtain which is a mechanical shutter when the front curtain of the shutter is an electronic shutter and the shutter speed is equal to or less than a predetermined speed to an amount of power to be allocated to the rear curtain which is a mechanical shutter.

The power amount setting unit can set the front curtain and the rear curtain to be mechanical shutters and the camera shake correction by the camera shake correction driving unit to be performed when the shutter speed is low, can set the front curtain to be an electronic shutter, the rear curtain to be a mechanical shutter, and the camera shake correction by the camera shake correction driving unit not to be performed when the shutter speed is high, and can make an amount of power to be allocated to the rear curtain when the shutter speed is high be larger than that to be allocated to drive the rear curtain when the shutter speed is low.

The power amount setting unit can set the front curtain and the rear curtain to be mechanical shutters and the camera shake correction by the camera shake correction driving unit not to be performed when the shutter speed is medium and can make an amount of power to be allocated to drive the mechanical shutter when the shutter speed is medium be larger than that to be allocated to drive the mechanical shutter when the shutter speed is low.

The amount of power to be allocated to drive the rear curtain when the shutter speed is high can be larger than that to be allocated to drive the rear curtain when the shutter speed is medium.

A power control method according to one aspect of the present technology includes steps of: controlling a shutter driving unit for driving a shutter; controlling a camera shake correction driving unit; and setting amounts of power to be allocated to the shutter driving unit and the camera shake correction driving unit according to the set shutter speed.

A non-transitory computer-readable storage medium storing a program according to one aspect of the present technology for causing a computer to execute processing including steps of: controlling a shutter driving unit for driving a shutter; controlling a camera shake correction driving unit; and setting amounts of power to be allocated to the shutter driving unit and the camera shake correction driving unit according to the set shutter speed.

The power controller, the power control method, and the program according to one aspect of the present technology control the shutter driving unit for driving the shutter and the camera shake correction driving unit and set amounts of power to be allocated to the shutter driving unit and the camera shake correction driving unit according to the set shutter speed.

Effects of the Invention

According to one aspect of the present technology, camera shake correction can be accurately performed, and power can be reduced.

Note that the effects described herein are not limited, and the effect may be any effects described in the present disclosure.

BRIEF DESCRIPTION OF DRAWINGS

FIG. 5 is a diagram to describe power distribution according to a shutter speed.

MODE FOR CARRYING OUT THE INVENTION

An embodiment for carrying out the present technology (referred to as an embodiment below) is described below. Note that, the description will be made in the following order.

1. Structure of image pickup device
2. A case where focal plane shutter is applied
3. Voltage according to shutter speed
4. Processing at low speed, medium speed, and high speed
5. Regarding recording medium <Structure of Image Pickup Device>

Figure 1:
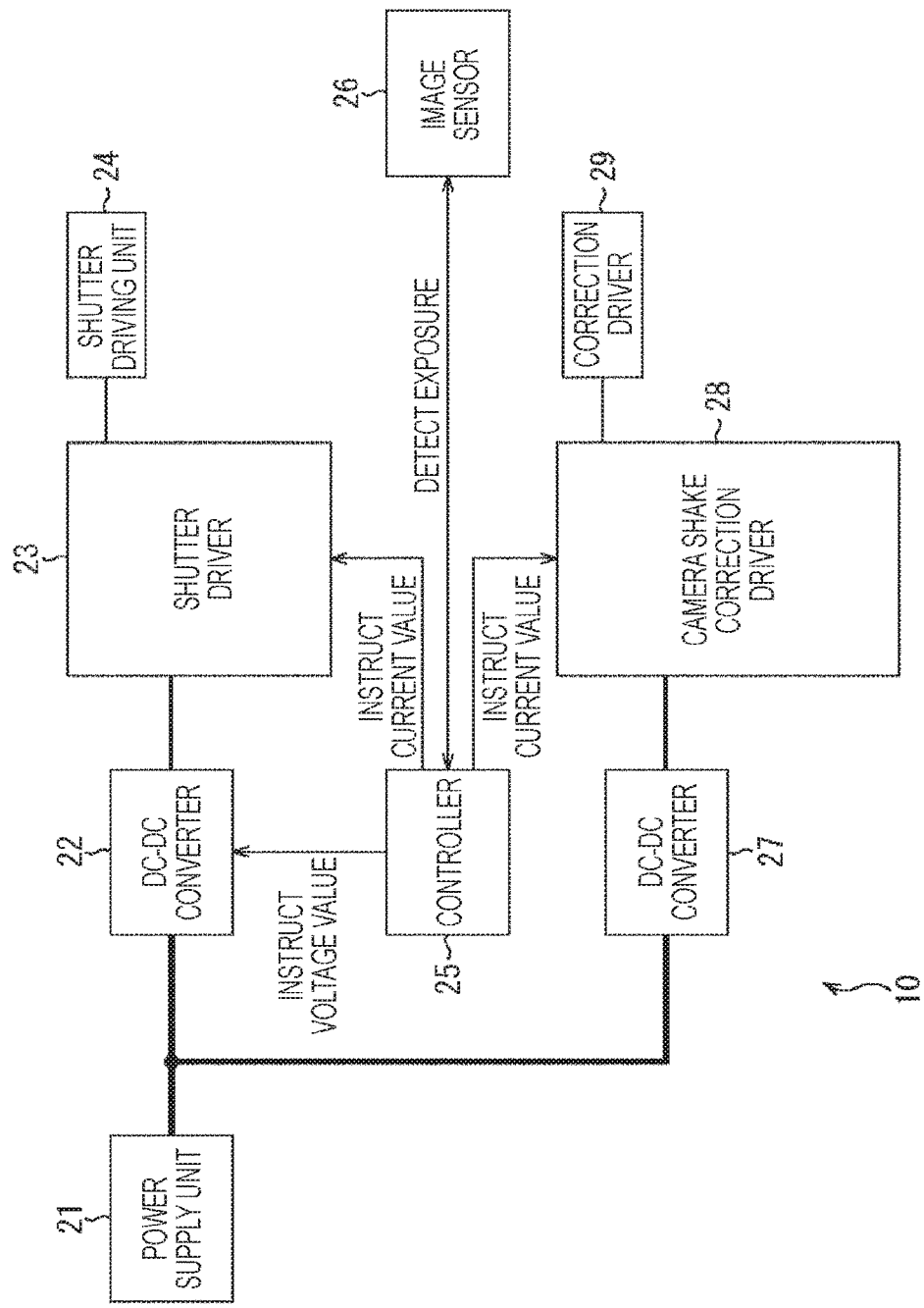
FIG. 1 is a diagram of a structure of an embodiment of an image pickup device to which the present technology has been applied.

FIG. 1 is a diagram of a structure of an embodiment of an image pickup device to which the present technology has been applied. An image pickup device 10 illustrated in FIG. 1 includes a power supply unit 21, a DC-DC converter 22, a shutter driver 23, a shutter driving unit 24, a controller 25, an image sensor 26, a DC-DC converter 27, a camera shake correction driver 28, and a correction driver 29.

In the image pickup device 10 illustrated in FIG. 1, components relating to power control according to a shutter speed (curtain speed to realize shutter speed) to be described below are illustrated. In addition to the functions illustrated in FIG. 1, for example, the image pickup device 10 includes a storage unit for storing data of an imaged image and a display unit for realizing a live view. However, the storage unit and the display unit are not illustrated.

The power supply unit 21 supplies power to each unit in the image pickup device 10. The DC-DC converter 22 converts the power supplied from the power supply unit 21 into power (voltage) instructed by the controller 25. The power converted by the DC-DC converter 22 is supplied to the shutter driver 23. The shutter driver 23 controls the shutter driving unit 24.

The shutter driving unit 24 has a structure including, for example, a motor to drive a shutter. The shutter driving unit 24 depends on the structure of the shutter. For example, in a case where a focal plane shutter is employed as a shutter, the shutter driving unit 24 drives a front curtain and a rear curtain included in the focal plane shutter.

The present technology can be applied to a shutter which receives power supply and includes a driving mechanism. Also, the present technology can be applied as being combined with an electronic shutter as described below.

The controller 25 is, for example, formed of a microcomputer for controlling each unit in the image pickup device 10. The image sensor 26 includes an image pickup element such as a CMOS and a CCD. The DC-DC converter 27 converts the power supplied from the power supply unit 21 into power necessary for the camera shake correction driver 28 to drive the correction driver 29.

The camera shake correction driver 28 controls the correction driver 29. When a predetermined object is imaged by the image pickup device 10, there is a possibility that the quality of the imaged image is deteriorated due to camera shake by a user who holds the image pickup device 10. The camera shake correction is correction to prevent the deterioration in the image quality described above.

The correction driver 29 has a structure including, for example, a motor to drive a movable lens. For example, to reduce the effect caused by the camera shake, the correction driver 29 moves the movable lens to a position, where an image can be imaged when the camera shake does not occur, according to an amount of the camera shake.

The present technology can be applied to a camera shake correction mechanism which receives power supply and includes a driving mechanism. The application of the present technology is not limited to an application to a device for performing camera shake correction by moving a lens.

Note that the structure of the image pickup device 10 illustrated in FIG. 1 is an example and does not indicate the limitation of the present technology. For example, in FIG. 1, the structure is illustrated in which the DC-DC converters 22 and 27 are provided. However, the structure which does not include these converters can be used according to the specifications of the shutter driver 23 and the camera shake correction driver 28.

Also, the structure can be used in which the power supply unit 21 includes the DC-DC converters 22 and 27.

The image pickup device 10 may be a lens (not illustrated) integrated device and may be a device having a detachable lens. When the image pickup device 10 is the lens integrated device, the camera shake correction driver 28 and the correction driver 29 are included in the image pickup device 10.

When the image pickup device 10 has a detachable lens, both the camera shake correction driver 28 and the correction driver 29 or the correction driver 29 can be included in a housing on the side of the lens. Also, even when the image pickup device 10 has a detachable lens, both the camera shake correction driver 28 and the correction driver 29 can be included in the image pickup device 10.

Here, as illustrated in FIG. 1, an example in which the camera shake correction driver 28 and the correction driver 29 are included in the image pickup device 10 is exemplified, and the description is continued. However, as described above, the present technology can be applied to a structure in which a part of the functions of the image pickup device 10 illustrated in FIG. 1 is provided on the side of the removable lens.

Figure 2:
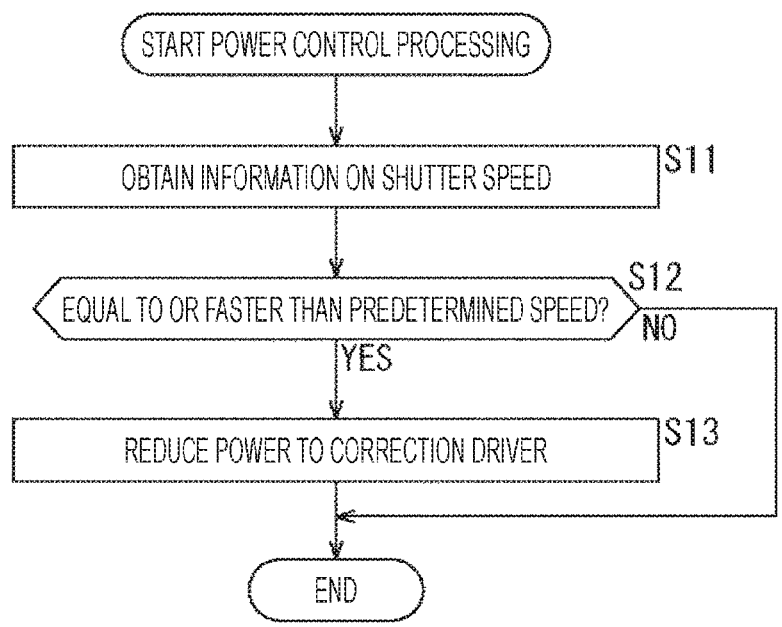
FIG. 2 is a flowchart to describe an operation of the image pickup device.

Processing of the image pickup device 10 illustrated in FIG. 1, mainly processing regarding power control is described with reference to the flowchart in FIG. 2.

The controller 25 obtains information on the shutter speed in step S11. The controller 25 detects an exposure of the image sensor 26 and sets the shutter speed based on the exposure. In step S12, the controller 25 determines whether the obtained shutter speed is equal to or more (faster) than a predetermined speed.

Here, it is assumed that the shutter speed equal to or more than the predetermined speed be a high speed and the shutter speed equal to or less (slower) than the predetermined speed be a low speed. When the shutter speed is high, even when the camera shake occurs, there is a low possibility to receive the effect of the camera shake.

Accordingly, when the shutter speed is high, it is considered that no effect caused by the camera shake is received and the image quality is not deteriorated without performing the camera shake correction. In other words, it is not necessary to perform the camera shake correction when the shutter speed is the speed at which the effect caused by the camera shake is not received and the image quality is not deteriorated even when the camera shake correction is not performed.

Accordingly, when it can be determined that the shutter speed is high, power for the camera shake correction is reduced to reduce the power consumption of the image pickup device 10. Therefore, the information on the shutter speed is obtained in step S11, and it is determined whether the shutter speed is high in step S12.

Also, here, the description is continuously made while assuming that the information on the shutter speed is obtained. However, the curtain speed derived from the shutter speed may be used to determine whether the curtain speed is equal to or more than a predetermined speed.

When it has been determined in step S12 that the shutter speed is high, the processing proceeds to step S13. In step S13, the power to the correction driver 29 is reduced. When it is assumed that the power necessary for the correction driver 29 to perform the camera shake correction be A mW, power set in step S13 is B mW smaller than A mW.

In a state where correction processing as the camera shake correction is not performed, it can be assumed that B mW be the power necessary to maintain the camera shake correction mechanism. For example, when the device includes a movable lens and performs the camera shake correction to offset camera shake amount by moving the movable lens according to the camera shake amount as the camera shake correction, it is necessary to hold the movable lens at a predetermined position to prevent the movable lens from moving due to an effect of gravity even when the correction is not performed. The power necessary to hold the movable lens in the above way is assumed to be B mW, and such power can be set.

For example, correction which does not need the above holding is performed as the camera shake correction, the power can be set to zero mW.

On the other hand, when it has been determined in step S12 that the shutter speed is not equal to or more than the predetermined speed, that is, when it has been determined that the shutter speed is low, the processing in step S13 is skipped. In this case, the power required for the camera shake correction is supplied to the correction driver 29. This state is appropriately mentioned as normal times.

As described above, the power consumption can be reduced by stopping the function relating to the camera shake correction according to the shutter speed.

Also, here, it is described that the function relating to the camera shake correction is stopped according to the shutter speed. However, the function relating the camera shake correction can be stopped according to the exposure and the curtain speed, not the shutter speed.

Also, when the shutter speed is high, since the power to be supplied to the correction driver 29 is reduced, the reduced power may be supplied to the shutter driving unit 24. When the shutter speed is high, since it is necessary to drive the shutter at high speed, a power supply amount can be increased than that at a low speed in order to drive the shutter at high speed. In this case, the shutter can be driven at high speed without increasing the power consumption at the high speed.

<Case where Focal Plane Shutter is Applied>

Next, a structure and an operation of the image pickup device when the focal plane shutter has been applied as the shutter of the image pickup device 10 are described.

Figure 3:
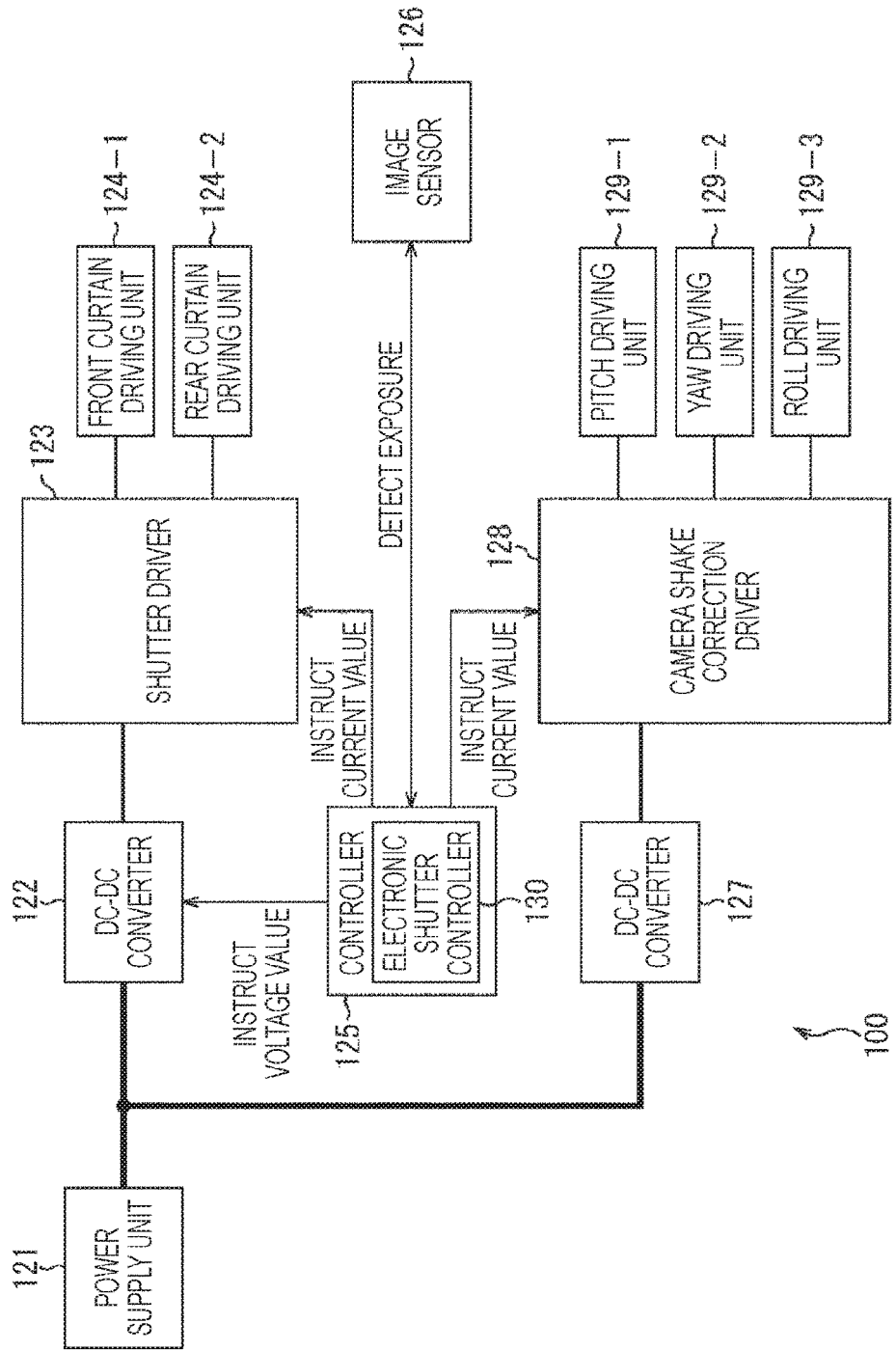
FIG. 3 is a diagram of a structure of an embodiment of the image pickup device to which the present technology has been applied.

An image pickup device 100 illustrated in FIG. 3 includes a power supply unit 121, a DC-DC converter 122, a shutter driver 123, a front curtain driving unit 124-1, a rear curtain driving unit 124-2, a controller 125, an image sensor 126, a DC-DC converter 127, a camera shake correction driver 128, a pitch driving unit 129-1, a yaw driving unit 129-2, a roll driving unit 129-3, and an electronic shutter controller 130.

In the image pickup device 100 illustrated in FIG. 3, the power supply unit 121, the DC-DC converter 122, the controller 125, the image sensor 126, and the DC-DC converter 127 are basically similar to corresponding parts of the image pickup device 10 illustrated in FIG. 1. Therefore, the description is appropriately omitted.

Since a focal plane shutter has been applied to the image pickup device 100 illustrated in FIG. 3, the image pickup device 100 includes a front curtain and a rear curtain. Also, the image pickup device 100 illustrated in FIG. 3 includes a mechanical shutter which is a mechanical shutter and an electronic shutter which is an electronic shutter as a shutter.

Note that a case where the electronic shutter is used as the front curtain is exemplified in the following description. However, the rear curtain may be the electronic shutter, and the present technology is applied to a case where both the front curtain and the rear curtain are electronic shutters.

The front curtain driving unit 124-1 drives the front curtain configuring the mechanical shutter. The rear curtain driving unit 124-2 drives the rear curtain configuring the mechanical shutter. The electronic shutter controller 130 controls the drive of the electronic shutter. The shutter driver 123 controls the front curtain driving unit 124-1 and the rear curtain driving unit 124-2 for driving the mechanical shutter.

Also, the electronic shutter is included in the image sensor 126 as one function. Therefore, in FIG. 3, the electronic shutter controller 130 is provided, and the electronic shutter controller 130 is illustrated as one function. However, the electronic shutter controller 130 is included in the controller 125 as one function, and the controller 125 controls the electronic shutter of the image sensor 126.

Here, to clarify the function to control the electronic shutter, the electronic shutter controller 130 is illustrated in the controller 125. The description continues while it is assumed that the electronic shutter controller 130 control the electronic shutter provided as one function of the image sensor 126.

The camera shake correction driver 128 controls the pitch driving unit 129-1, the yaw driving unit 129-2, and the roll driving unit 129-3. As the function to perform camera shake correction, the pitch driving unit 129-1 for correcting the camera shake in the pitch direction, the yaw driving unit 129-2 for correcting the camera shake in the yaw direction, and the roll driving unit 129-3 for correcting the camera shake in the roll direction are included.

Also, the structure of the image pickup device 100 illustrated in FIG. 3 is an example and does not indicate the limitation of the present technology. For example, in FIG. 3, the structure is illustrated in which the DC-DC converters 122 and 127 are provided. However, the structure which does not include these converters can be used according to the specifications of the shutter driver 123 and the camera shake correction driver 128.

Also, the structure can be used in which the power supply unit 121 includes the DC-DC converters 122 and 127.

An operation of the image pickup device 100 illustrated in FIG. 3, mainly an operation regarding power control is described with reference to the flowchart illustrated in FIG. 4.

The controller 125 obtains information on the shutter speed in step S111, and it is determined in step S112 whether the shutter speed is low. The processing in steps S111 and S112 is basically performed in a similar way to the processing in steps S11 and S12 (FIG. 2).

Here, the description is continued in a state where the shutter speed is classified into the low speed, the medium speed, and the high speed and it is assumed that the power be control according to each speed. As an example, the low speed is a speed up to $\frac{1}{1000}$ seconds (equal to or more than $\frac{1}{1000}$ seconds), the medium speed is a speed of $\frac{1}{1000}$ to $\frac{1}{4000}$ seconds (more than $\frac{1}{1000}$ seconds and equal to or less than $\frac{1}{4000}$ seconds), and the high speed is a speed of $\frac{1}{4000}$ to $\frac{1}{8000}$ seconds (more than $\frac{1}{4000}$ seconds and equal to or less than $\frac{1}{8000}$ seconds).

When the shutter speed is medium and high, the camera shake does not affect or hardly affects the image pickup device even when the camera shake correction is not performed. When the shutter speed is medium and high, there is a low probability that the image quality is deteriorated. In this case, the camera shake correction is set not to be performed.

At the high speed of the shutter speed, the front curtain is an electronic shutter. When the shutter speed is high, it is necessary to drive the front curtain and the rear curtain at high speed. When the shutter speed is high, it is necessary to maintain a slit width formed by the front curtain and the rear curtain to be narrow and to drive the shutter at high speed. There is a limit in creating the above state by using the mechanical shutters, and it is difficult to increase the shutter speed. Therefore, at the time of high speed, the electronic shutter is used as the front curtain, and the mechanical shutter is used as the rear curtain.

When the shutter speed is medium, the mechanical shutters are used as the front curtain and the rear curtain without performing the camera shake correction. When the shutter speed is medium, since the possibility that the image quality is deteriorated by the effect caused by the camera shake is low, the camera shake correction is not performed. Also, when the shutter speed is medium, since the mechanical shutter can perform an appropriate operation according to the shutter speed, the mechanical shutter is used.

When the shutter speed is low, the camera shake correction is performed, and the mechanical shutters are used as the front curtain and the rear curtain. When the shutter speed is low, since the image quality may be deteriorated by the effect caused by the camera shake, the camera shake correction is performed. Also, when the shutter speed is low, since the mechanical shutter can perform an appropriate operation according to the shutter speed, the mechanical shutter is used.

Also, for example, when the electronic shutter is set to be used as the front curtain according to the setting by a user even when the shutter speed is medium or low, the electronic shutter is used according to the settings. Also, the present technology can be applied to a device which does not include a mechanical shutter as a front curtain. In such a device, the electronic shutter is used as the front curtain when the shutter speed is medium or low.

Here, a case is exemplified in which the mechanical shutters are used as the front curtain and the rear curtain in a case of the medium speed and the low speed. However, as described above, according to the setting by the device and the user, the electronic shutter may be used when the shutter speed is low and medium.

In this way, it is determined whether the camera shake correction is performed and whether the electronic shutter is used as the front curtain according to the shutter speed, i.e., the low speed, the medium speed, and the high speed. Therefore, it is determined in step S112 whether the shutter speed is low.

When it has been determined in step S112 that the shutter speed is low, the processing proceeds to step S113. In step S113, the mechanical shutter is set to be used, and the power is normally distributed for the shutter and the camera shake correction.

The controller 125 instructs the shutter driver 123 to supply power necessary to drive the front curtain and the rear curtain of the mechanical shutter by the front curtain driving unit 124-1 and the rear curtain driving unit 124-2. Also, the controller 125 instructs the camera shake correction driver 128 to supply power necessary to perform correction according to the camera shake correction amount by the pitch driving unit 129-1, the yaw driving unit 129-2, and the roll driving unit 129-3.

Here, it is assumed that the power be normally distributed to the shutter and the camera shake correction. Here, the maximum of the total amount of power (maximum power amount) supplied to the shutter driver 123 and the camera shake correction driver 128 is set to be constant. The description is continued while it is assumed that the maximum power amount be distributed to an actuator for a shutter and an actuator for camera shake correction.

Furthermore, here, the description is continued while it is assumed that the total of the power to be supplied to the actuator for a shutter and the power to be supplied to the actuator for camera shake correction be the maximum power amount. However, it is not necessary to distribute the power so that the total becomes the maximum power amount, and it is preferable that the power is distributed within a range of the maximum power amount.

Here, the description is continued while it is assumed that the maximum power amount be 1000 mW. An exemplary power amount to be distributed to the actuator for a shutter and the actuator for camera shake correction is described by using specific values with reference to FIG. 5.

In the chart illustrated in FIG. 5, the shutter speed is indicated in the horizontal direction, and the actuator for a shutter and the actuator for camera shake correction are indicated in the vertical direction. The front curtain driving unit 124-1 and the rear curtain driving unit 124-2 are the actuators for a shutter, and the pitch driving unit 129-1, the yaw driving unit 129-2, and the roll driving unit 129-3 are the actuators for camera shake correction.

In a case of the low speed, power of 350 mW is allocated to each of the front curtain driving unit 124-1 and the rear curtain driving unit 124-2, and power of 100 mW is allocated to each of the pitch driving unit 129-1, the yaw driving unit 129-2, and the roll driving unit 129-3.

In a case of the medium speed, power of 470 mW is allocated to each of the front curtain driving unit 124-1 and the rear curtain driving unit 124-2, and power of 20 mW is allocated to each of the pitch driving unit 129-1, the yaw driving unit 129-2, and the roll driving unit 129-3.

In a case of the high speed, power of zero mW is allocated to the front curtain driving unit 124-1, power of 940 mW is allocated to the rear curtain driving unit 124-2, and power of 20 mW is allocated to each of the pitch driving unit 129-1, the yaw driving unit 129-2, and the roll driving unit 129-3.

When the power supplied to the actuator for a shutter is increased, the curtain speeds of the front curtain and the rear curtain can be increased. As described above, although the power supplied to the actuator for a shutter is 350 mW in a case of the low speed, the power of 470 mW is supplied in a case of the medium speed. In this way, a power amount to be supplied to the actuator for a shutter can be changed according to the shutter speed (curtain speed), and power necessary for a desired curtain speed can be supplied.

Also, when the shutter speed is high, since the electronic shutter is used as the front curtain, it is not necessary to supply power to the front curtain driving unit 124-1 for driving the front curtain. The power which is not supplied to the front curtain driving unit 124-1 can be supplied to the rear curtain driving unit 124-2 for driving the rear curtain. That is, in the example illustrated in FIG. 5, when the shutter speed is high, the power supplied to the front curtain driving unit 124-1 is set to be zero mW so that the power of 940 (=470+470) mW is supplied to the rear curtain driving unit 142-2.

When the shutter speed is high, it is necessary to drive the rear curtain at high speed. Therefore, it is necessary to supply much power to the rear curtain driving unit 124-2. According to the present technology, since much power can be supplied to the rear curtain when the shutter speed is high, the rear curtain can be driven at high speed. Therefore, a faster shutter speed can be realized.

Also, an appropriate power can be distributed and supplied to the actuator for a shutter and the actuator for camera shake correction within the amount of power which can be supplied to the actuator for a shutter and the actuator for camera shake correction.

Figure 4:
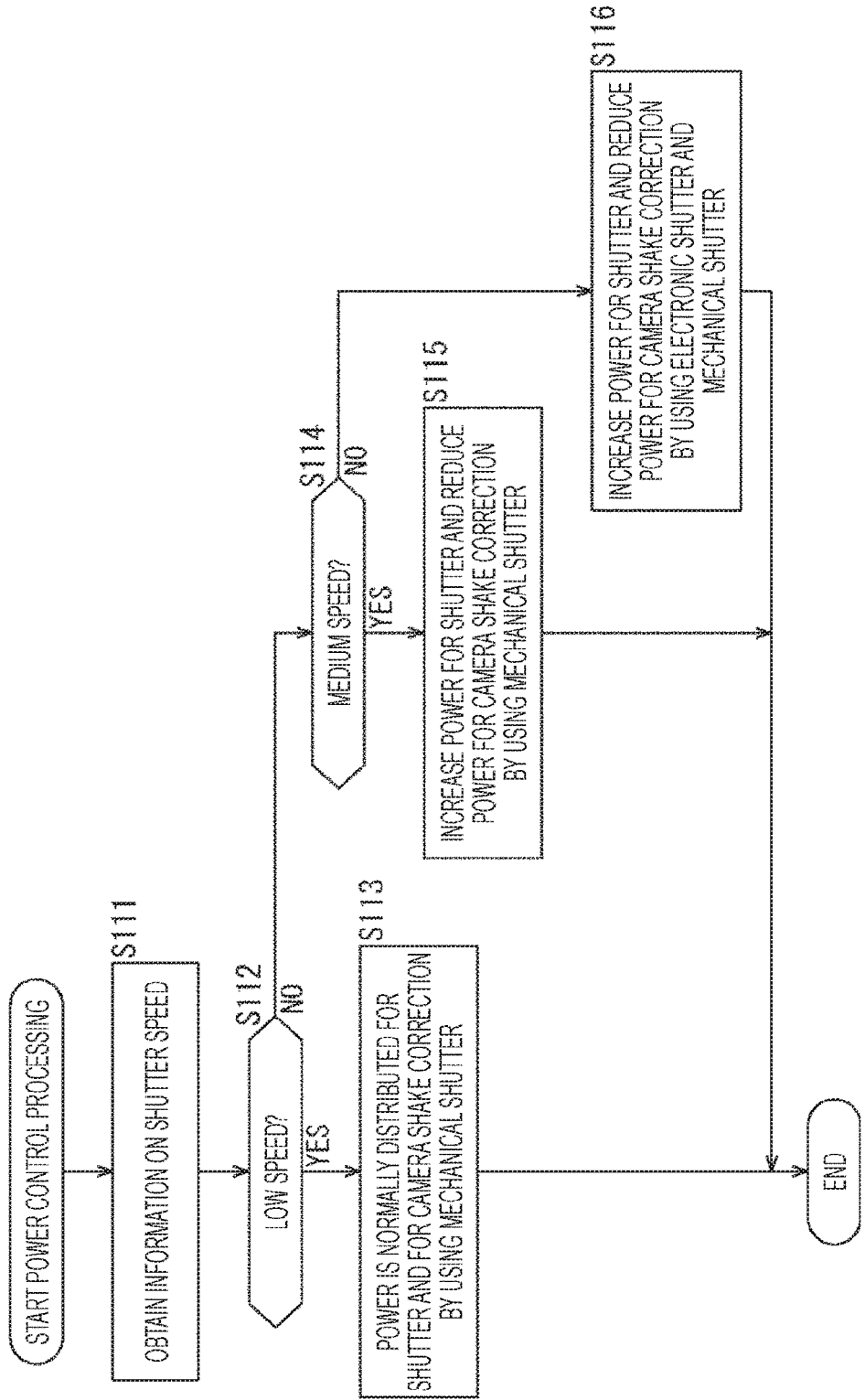
FIG. 4 is a flowchart to describe an operation of the image pickup device.

The description returns to the flowchart in FIG. 4. As described above, both the front curtain and the rear curtain are set to be the mechanical shutters when the shutter speed is low, and the camera shake correction is set to be performed. Also, power is supplied for the shutters and the camera shake correction.

On the other hand, when it has been determined in step S112 that the shutter speed is not low, the processing proceeds to step S114. In step S114, it is determined whether the shutter speed is medium. When it has been determined in step S114 that the shutter speed is medium, the processing proceeds to step S115.

In step S115, the mechanical shutter is set to be used, and the power for a shutter is set to be high. Also, the power for camera shake correction is set to be reduced. For example, as described with reference to FIG. 5, the power for a shutter is 350 mW when the shutter speed is low. Whereas, the power is set to be 470 mW when the shutter speed is medium. Accordingly, the power for a shutter is set to be high.

Also, the power for camera shake is 100 mW when the shutter speed is low. Whereas, the power for camera shake is set to be 20 mW when the shutter speed is medium. Accordingly, the power for camera shake is set to be low. When the shutter speed is medium, the camera shake correction is set not to be performed. Therefore, power for holding a camera shake correction mechanism is supplied to the actuator for camera shake correction.

On the other hand, when it has been determined in step S114 that the shutter speed is not the medium speed, the processing proceeds to step S116. In this case, it has been determined that the shutter speed is high.

In step S116, the front curtain is set to be the electronic shutter, and the rear curtain is set to be the mechanical shutter. Also, the power for a shutter for a rear curtain is set to be high, and the power for camera shake correction is set to be reduced. For example, as described with reference to FIG. 5, the power for a shutter is 470 mW when the shutter speed is medium. Whereas, the power for the rear curtain when the shutter speed is high is set to be 940 mW. Accordingly, the power for a shutter is set to be high. Since the front curtain is the electronic shutter, the power of zero mW is supplied. As described above, the power for the front curtain can be supplied to the shutter of the rear curtain.

Also, the power for camera shake is 100 mW when the shutter speed is low. Whereas, the power for camera shake is set to be 20 mW when the shutter speed is high. Accordingly, the power for camera shake is set to be low. When the shutter speed is high, the camera shake correction is set not to be performed. Therefore, power for holding a camera shake correction mechanism is supplied to the actuator for camera shake correction.

In this way, according to the shutter speed, the curtain speed, and the exposure, the operation of the actuator for camera shake correction is stopped (holding state) when the shutter speed is high and medium, and the power to be supplied to the actuator for camera shake correction can be allocated to the actuator for a shutter. This can make the speed of the shutter (curtain speed) be faster, and faster shutter speed control can be performed by increasing the curtain speed.

Also, at the time of the low speed when the camera shake correction is needed, since the power to drive the shutter may be small, the power for a shutter can be allocated to the actuator for camera shake correction.

By performing such power control, the mechanical shutter during exposure, for example, an electromagnetic driven shutter and the actuator for camera shake correction can be exclusively driven. Also, a peak current can be reduced, and a stamina performance can be secured.

Also, in the above embodiment, when the shutter speed is high, the electronic shutter is used as the front curtain so that the power can be concentrated to the rear curtain which is a mechanical shutter, and the faster curtain speed can be realized.

<Voltage According to Shutter Speed>

In a case where the shutter speed is increased by the above processing, it is necessary to consider an inductance of a motor when the motor is used as the actuator for a shutter. The motor has a large inductance, and a current rises based on a time constant L/R determined based on an inductance L of the motor and a resistance value R of the motor.

Figure 6:
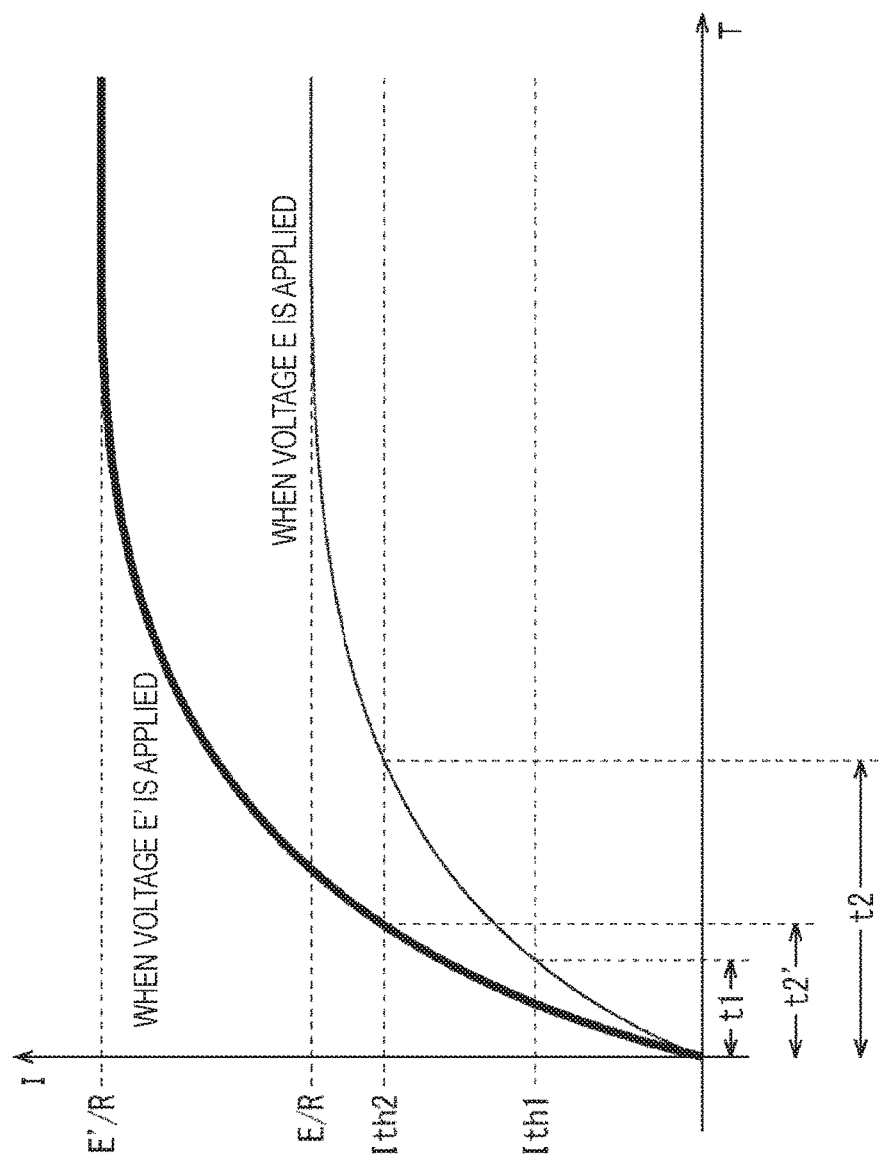
FIG. 6 is a diagram to describe voltage control.

FIG. 6 is a diagram of a rising waveform of the current of the motor. The horizontal axis in the graph illustrated in FIG. 6 indicates a time, and the vertical axis indicates a current. A thin curved line in FIG. 6 indicates a waveform when a voltage E is applied to the motor, and a thick curved line indicates a waveform when a voltage E' is applied to the motor. The voltage E and the voltage E' are values satisfying voltage E<voltage E'.

With reference to the waveform when the voltage E is applied illustrated in FIG. 6, even when a current value Ith1 is increased to a current value Ith2 while the voltage E is maintained, a time t2 is needed before the current value reaches the target current value Ith2.

In the above description, it is assumed that the same voltage E be applied when the shutter speed is low, medium, and high. Also, it is assumed that the current at the time when the shutter speed is high be the current value Ith1 and the current at the time when the shutter speed is medium be the current value Ith2. Time until the current value reaches the target current value Ith1 when the shutter speed is low is the time t1, and the time until the current value reaches the target current value Ith2 when the shutter speed is medium is the time t2.

It is necessary increase the curtain speed at the time of the medium shutter speed than that in a case of the low shutter speed. A situation may occur in which the shutter curtain (front curtain and rear curtain) should start to be driven before the time t2 elapses, in other words, before the current value becomes the target current value Ith2 when the shutter speed is medium. To control the shutter speed within a range where this situation does not occur, the curtain speed cannot be improved even when the current value is increased, and there is a possibility that the shutter speed cannot be increased.

A case where the voltage E' higher than the voltage E is applied is described with reference to the waveform indicated by the thick line in the graph in FIG. 6. When the voltage E' is applied, in a situation similar to that described above, a time needed before the voltage reaches the target voltage value Ith2 is a time t2'. The time t2' is shorter than the time t2.

By shortening the time before the voltage reaches the target voltage value Ith2, a possibility is reduced that the shutter curtain (front curtain and rear curtain) should start to be driven before the time t2 elapses, in other words, before the current value becomes the target current value Ith2 at the time of the medium shutter speed.

In this way, by increasing the voltage to be applied, the time before the current reaches the target current can be shortened. Accordingly, the curtain speed can be increased, and the shutter speed can be improved.

Therefore, the voltage value to be applied to the actuator (motor) for driving the shutter may be changed according to the shutter speed, i.e., the low speed, the medium speed, and the high speed.

The image pickup device 100 illustrated in FIG. 3 is referred again. The controller 125 instructs a voltage value to the DC-DC converter 122 and instructs a current value to the shutter driver 123. As described with reference to FIG. 6, the controller 125 instructs the DC-DC converter 122 to apply the voltage E when the shutter speed is low and instructs the DC-DC converter 122 to apply the voltage E' when the shutter speed is medium. Also, the controller 125 can instruct to apply a voltage E" higher than the voltage E' when the shutter speed is high.

In this way, by changing the voltage value according to the shutter speed (curtain speed), an increase in the shutter speed can be realized.

<Processing at Low Speed, Medium Speed, and High Speed>

Here, the processing of the image pickup device 100 at the time of the low shutter speed, the medium shutter speed, and the high shutter speed is additionally described.

Figure 7:
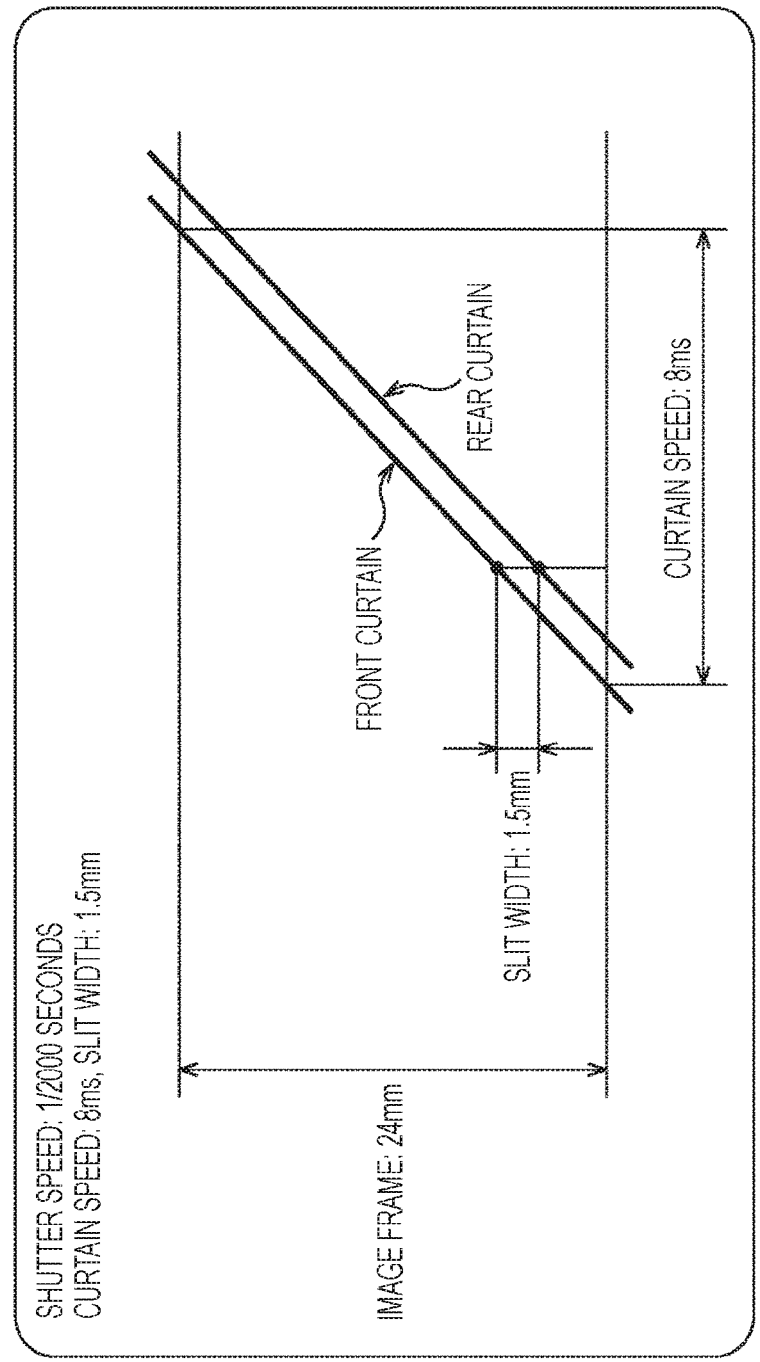
FIG. 7 is a diagram to describe an operation at a low speed.
Figure 8:
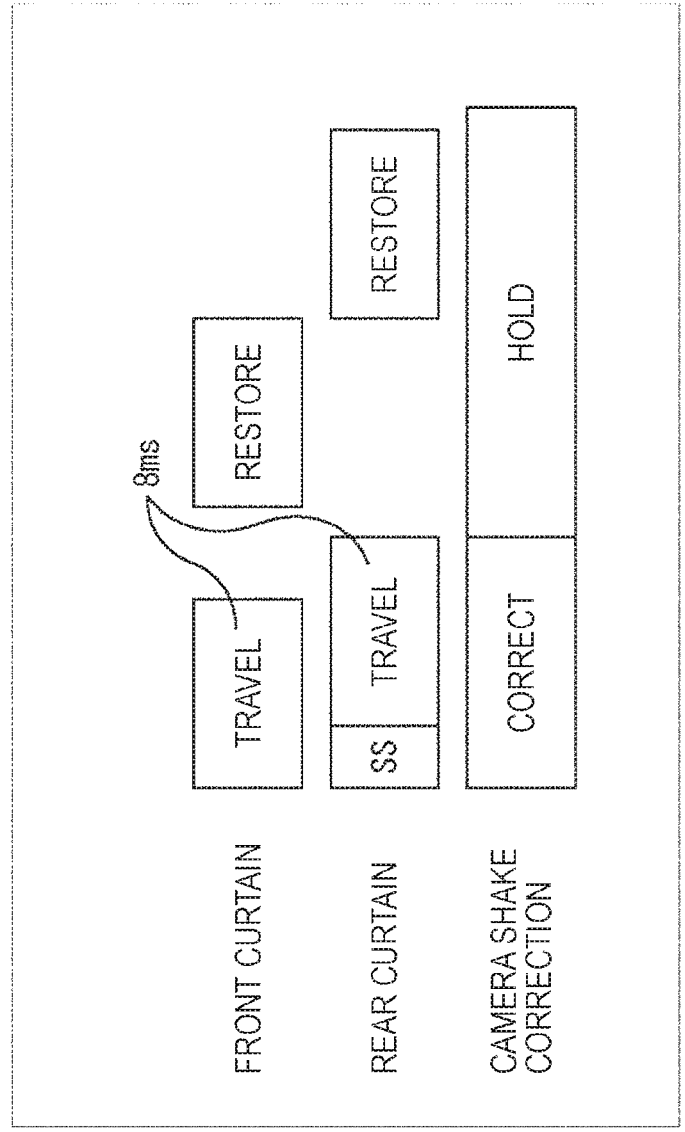
FIG. 8 is a diagram to describe the operation at the low speed.

FIGS. 7 and 8 are diagrams to describe a curtain speed at the time of the low speed. In the following description, a case is exemplified where a length of an image frame is 24 mm, and the curtain speed is described. FIG. 7 is a shutter curtain speed diagram of a case where the shutter speed is low, here, ½000 seconds.

When the shutter speed is ½000 seconds, the curtain speed is set to be eight ms, and the slit width of the front curtain and the rear curtain is set to be 1.5 mm. When the shutter speed is low, since the mechanical shutter is applied as a shutter. Therefore, as illustrated in FIG. 8, the front curtain of the mechanical shutter starts traveling at the speed of eight ms, and the rear curtain of the mechanical shutter starts traveling after a lapse of time according to the shutter speed (time indicated as SS in FIG. 8), in this case, ½000 seconds.

While the front curtain and the rear curtain travel, the camera shake correction is performed. After the rear curtain is stopped, the state pf the camera shake correction is shifted to the holding state. When the camera shake correction is in the holding state, restoration processing is performed to the front curtain and the rear curtain. The restoration processing is processing to return the curtains to a state where the curtains can be driven for next photography.

The above movement of the curtains is performed as a single photographing when the shutter speed is low.

By applying the present technology, the voltage value, the current value, and the power value can be appropriately changed according to the shutter speed. Therefore, for example, control illustrated in FIG. 9 can be performed. Similar to FIG. 7, the diagram illustrated in FIG. 9 is a shutter curtain speed diagram when the shutter speed is ½000 seconds.

Figure 9:
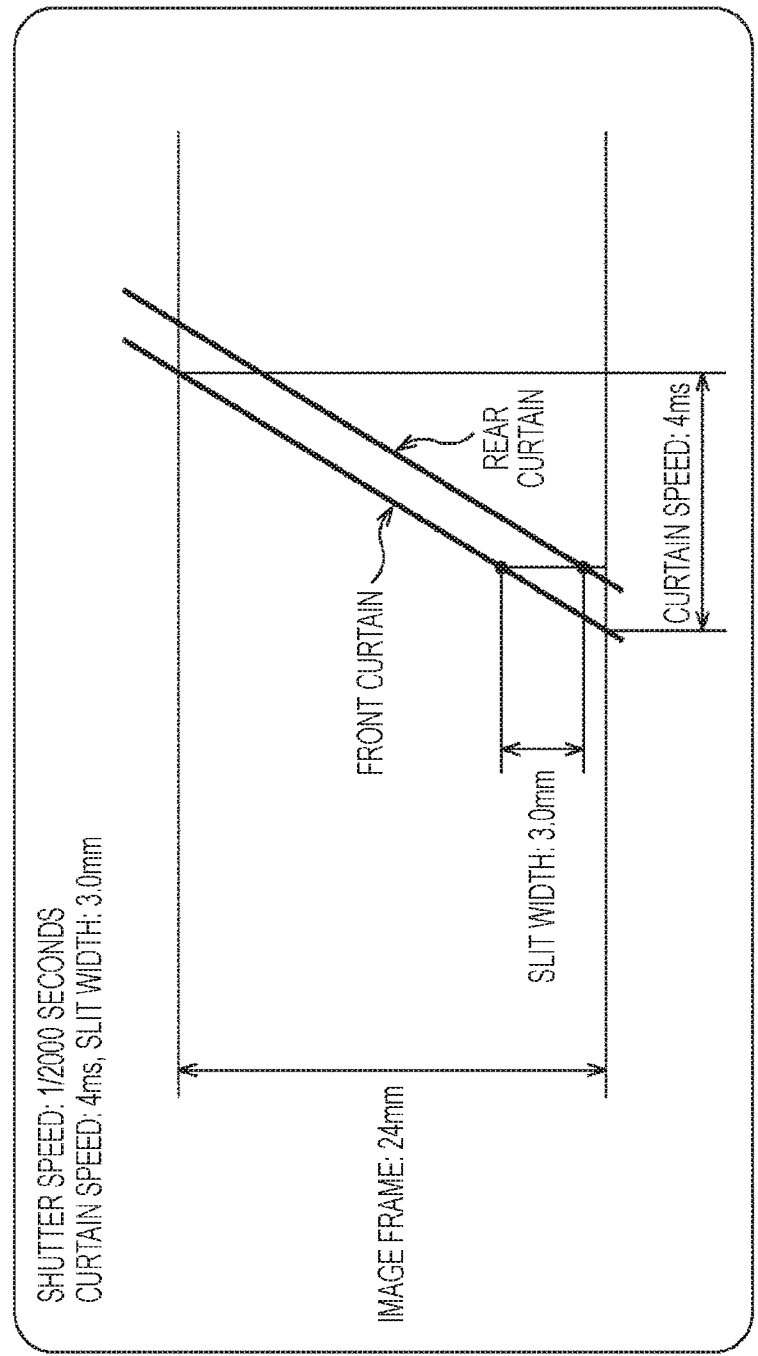
FIG. 9 is a diagram to describe an operation at a low speed.

The curtain speed indicated in FIG. 9 is four ms, and the slit width is set to be 3.0 mm. When the setting illustrated in FIG. 7 is compared with that illustrated in FIG. 9, the curtain speed in the setting illustrated in FIG. 7 is eight ms. Whereas, the curtain speed in the setting illustrated in FIG. 9 is four ms that is faster than that in FIG. 7. Also, the slit width in the setting indicated in FIG. 7 is 1.5 mm. Whereas, the slit width in the setting indicated in FIG. 9 is set to be 3.0 mm wider than that in FIG. 7.

In this way, by changing the curtain speed and the slit width, the same shutter speed can be realized. According to the present technology, as described above, the voltage value, the current value, and the power value can be appropriately changed. Therefore, the shutter speed of ½000 seconds can be realized with the setting illustrated in FIG. 7, and the shutter speed of ½000 seconds can be realized with the setting illustrated in FIG. 9.

Figure 10:
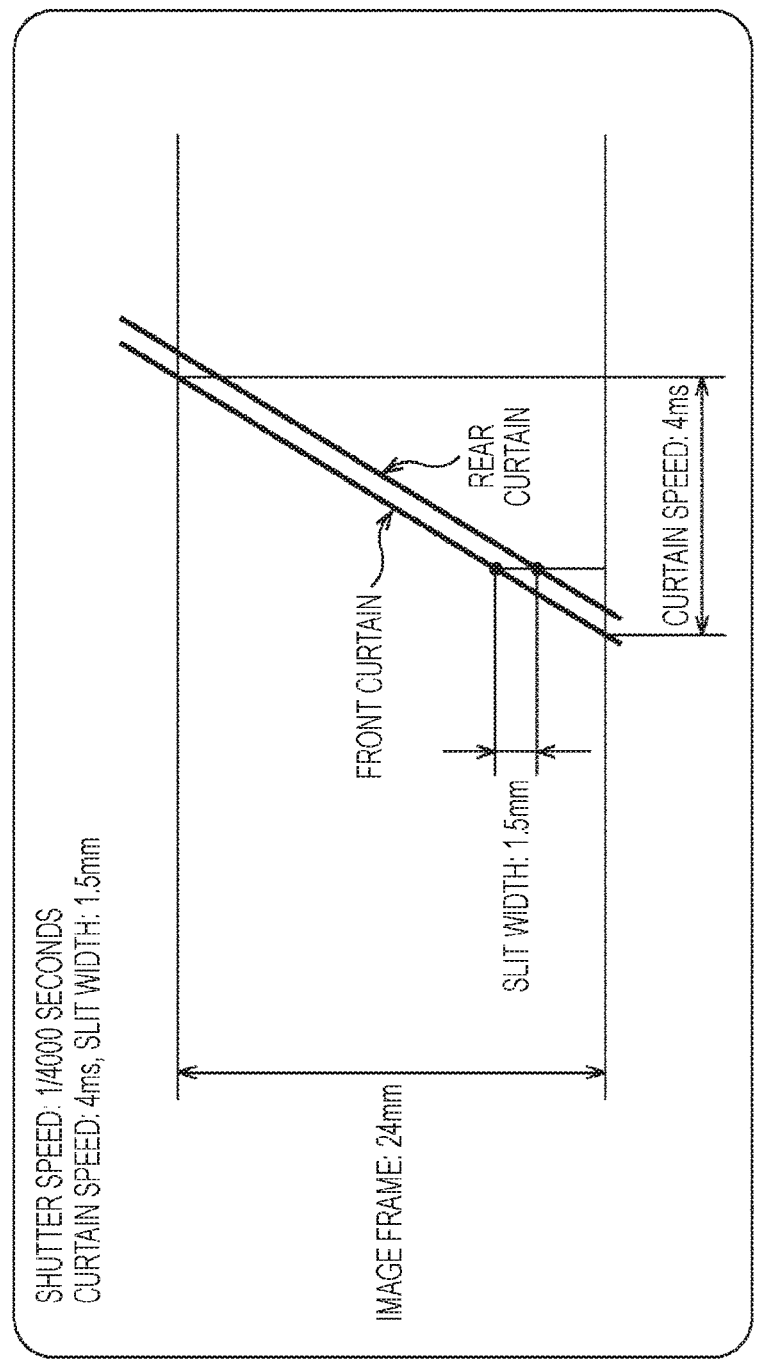
FIG. 10 is a diagram to describe an operation at a medium speed.
Figure 11:
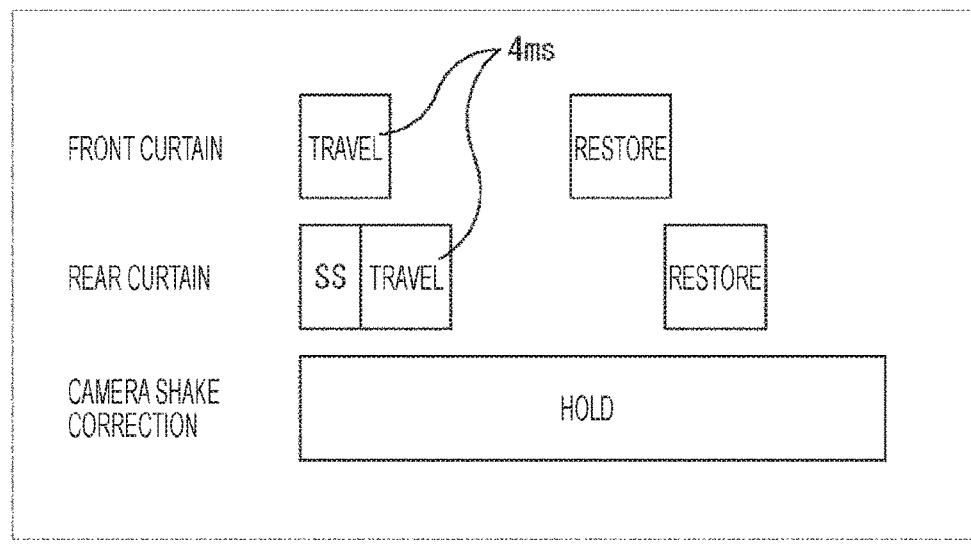
FIG. 11 is a diagram to describe the operation at the medium speed.

FIGS. 10 and 11 are diagrams to describe the curtain speed at the time of the medium shutter speed and shutter curtain speed diagrams in a case where the length of the image frame is 24 mm and the shutter speed is ¼000 seconds.

When the shutter speed is ¼000 seconds, the curtain speed is set to be four ms, and the slit width of the front curtain and the rear curtain is set to be 1.5 mm. When the shutter speed is medium, since the mechanical shutter is applied as a shutter. Therefore, as illustrated in FIG. 11, the front curtain which is the mechanical shutter starts traveling at the speed of four ms, and the rear curtain which is the mechanical shutter starts traveling at a time point before a lapse of a time according to the shutter speed (time indicated as SS in FIG. 8), in this case, 1/4000 seconds. In this case, there is a period of time when the front curtain and the rear curtain concurrently travel.

When the shutter speed is medium, the camera shake correction is set not to be performed. Therefore, the camera shake correction mechanism is held. After the front curtain and the rear curtain travel, the restoration processing is performed to the curtains. The above movement of the curtains is performed as a single photographing when the shutter speed is medium.

Figure 12:
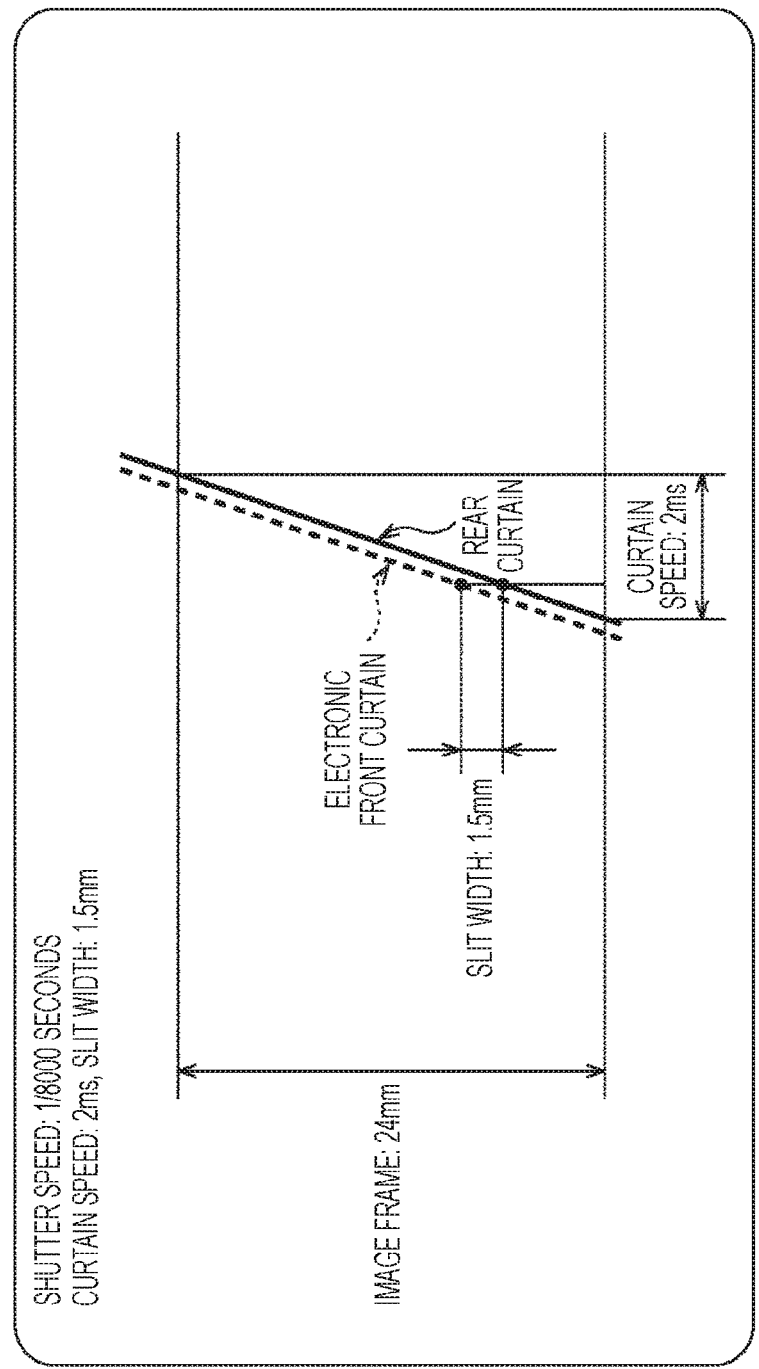
FIG. 12 is a diagram to describe an operation at a high speed.
Figure 13:
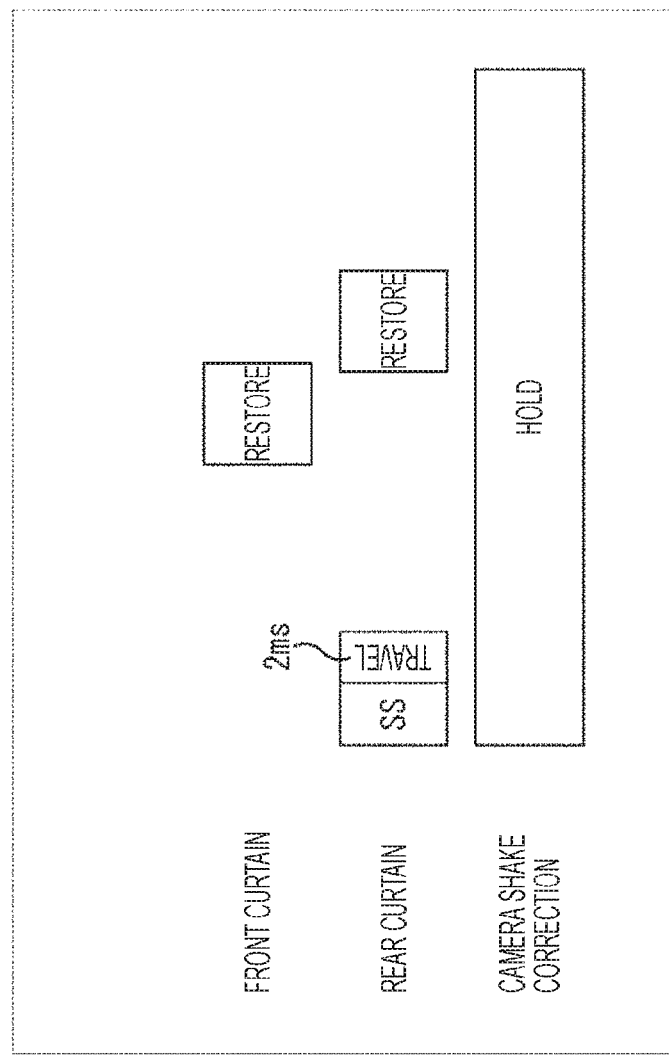
FIG. 13 is a diagram to describe the operation at the high speed.

FIGS. 12 and 13 are diagrams to describe the curtain speed at the time of the high shutter speed and shutter curtain speed diagrams in a case where the length of the image frame is 24 mm and the shutter speed is 1/8000 seconds.

When the shutter speed is 1/8000 seconds, the curtain speed is set to be two ms, and the slit width of the front curtain and the rear curtain is set to be 1.5 mm. Since the electronic shutter is applied as a shutter when the shutter speed is high, as illustrated in FIG. 13, the front curtain of the mechanical shutter does not travel. At the time when time according to the shutter speed (time indicated as SS in FIG. 13), in this case, 1/8000 seconds has elapsed, the rear curtain which is the mechanical shutter starts to travel.

As described above, when the shutter speed is high, by using an electronic front curtain as a front curtain, much power can be allocated to drive the mechanical shutter which is the rear curtain, and the mechanical shutter can be driven at high speed. Therefore, as illustrated in FIG. 12, a high curtain speed can be realized.

When the shutter speed is high, the camera shake correction is set not to be performed. Therefore, the camera shake correction mechanism is held. After the front curtain and the rear curtain travel, the restoration processing is performed to the curtains. The above movement of the curtains is performed as a single photographing when the shutter speed is high.

In this way, according to the present technology, power (voltage and current) to be supplied to the actuator for driving a shutter and the actuator for camera shake correction can be appropriately controlled according to the shutter speed.

When it is not necessary to perform the camera shake correction, in other words, when the shutter speed is high, high shutter speed control can be performed by supplying a large current to the shutter driving unit to increase the curtain speed. When the camera shake correction is needed, in other words, when the shutter speed is low, low shutter speed control can be performed by supplying a small current to the shutter driving unit and at a low curtain speed.

Since the above control is available, the electromagnetic driven shutter during the exposure and the camera shake correction can be exclusively driven. Also, a peak current can be reduced, and a stamina performance can be secured.

In addition, when the front curtain is an electronic shutter, all the power can be concentrated to the rear curtain which is a mechanical shutter. Therefore, a faster curtain speed can be realized.

<Regarding Recording Medium>

The above-mentioned series of processing can be performed by hardware and software. When the series of the processing is performed by the software, a program included in the software is installed in a computer. Here, the computer includes a computer incorporated in dedicated hardware and, for example, a general personal computer which can perform various functions by installing various programs.

Figure 14:
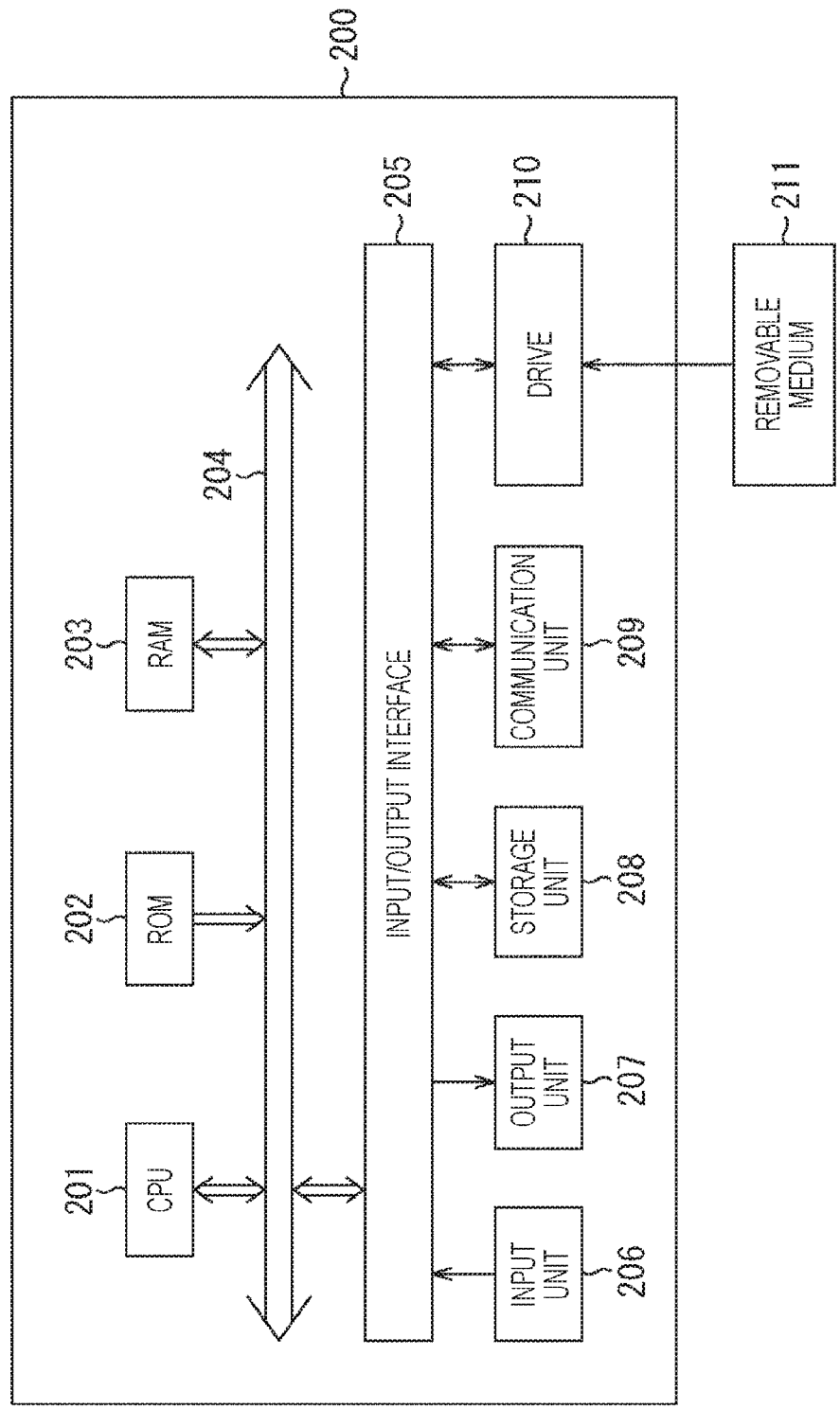
FIG. 14 is a diagram of a recording medium.

FIG. 14 is a block diagram of an exemplary structure of hardware of the computer for performing the above-mentioned series of processing by the program. In the computer, a central processing unit (CPU) 201, a read only memory (ROM) 202, and a random access memory (RAM) 203 are connected to each other with a bus 204. In addition, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, a microphone, and the like. The output unit 207 includes a display, a speaker, and the like. The storage unit 208 includes a hard disk, a non-volatile memory, and the like. The communication unit 209 includes a network interface and the like. The drive 210 drives a removable medium 211 such as a magnetic disk, an optical disk, an optical magnetic disk, or a semiconductor memory.

In the computer configured as above, the CPU 201 loads, for example, the program stored in the storage unit 208 to the RAM 203 via the input/output interface 205 and the bus 204 and performs the program so that the above-mentioned series of processing is performed.

The program executed by the computer (CPU 201), for example, can be provided by recording it to the removable medium 211 as a package medium and the like. Also, the program can be provided via a wired or wireless transmission medium such as a local area network, the internet, and a digital satellite broadcast.

In the computer, the program can be installed to the storage unit 208 via the input/output interface 205 by mounting the removable medium 211 in the drive 210. Also, the program can be received by the communication unit 209 via the wired or wireless transmission media and installed to the storage unit 208. In addition, the program can be previously installed to the ROM 202 and the storage unit 208.

Note that, the program performed by the computer may be a program in which processing is performed along the order described herein in a time series manner and a program in which the processing is performed in parallel or at a necessary timing when a call has been performed.

Also, in the present specification, the system indicates a whole device including a plurality of devices.

Note that the effects described herein are only exemplary and not limited to these. Also, there may be an additional effect.

Furthermore, the embodiment of the present technology is not limited to the above-mentioned embodiments, and various changes can be made without departing from the scope of the present technique.

Note that, the present technology can have the structure below.

(1)

A power controller comprising:

a shutter controller configured to control a shutter driving unit;

a camera shake correction controller configured to control a camera shake correction driving unit; and a power amount setting unit configured to set power amounts to be allocated to the shutter driving unit and the camera shake correction driving unit according to a set shutter speed.

(2)
The power controller according to (1), wherein
in a case where the shutter speed is faster than a predetermined speed, the power amount setting unit allocates an amount of power to be supplied to the camera shake correction driving unit when the shutter speed is equal to or less than the predetermined speed to the shutter driving unit.

(3)
The power controller according to (1), wherein
when the shutter speed is faster than a predetermined speed, the power amount setting unit allocates an amount of power necessary to maintain a state where the camera shake correction driving unit is held to the camera shake correction driving unit.

(4)
The power controller according to (1) to (3), wherein
the power amount setting unit changes a voltage to be applied to the shutter driving unit according to the shutter speed.

(5)
The power controller according to (1) to (3), wherein
when the shutter speed is high, the power amount setting unit increases a voltage to be applied to the shutter driving unit.

(6)
The power controller according to (1) to (5), wherein
the shutter is a focal plane shutter.

(7)
The power controller according to (1) to (6), wherein
the shutter includes a front curtain and a rear curtain.

(8)
The power controller according to (7), wherein
the front curtain of the shutter is an electronic shutter or a mechanical shutter, and the rear curtain is a mechanical shutter.

(9)
The power controller according to (8), wherein
when the shutter speed is faster than a predetermined speed, the power amount setting unit adds an amount of power to be allocated to the front curtain which is a mechanical shutter when the front curtain of the shutter is an electronic shutter and the shutter speed is equal to or less than a predetermined speed to an amount of power to be allocated to the rear curtain which is a mechanical shutter.

(10)
The power controller according to (7), wherein
the power amount setting unit
sets the front curtain and the rear curtain to be mechanical shutters and the camera shake correction by the camera shake correction driving unit to be performed when the shutter speed is low,
sets the front curtain to be an electronic shutter, the rear curtain to be a mechanical shutter, and the camera shake correction by the camera shake correction driving unit not to be performed when the shutter speed is high, and
makes an amount of power to be allocated to drive the rear curtain when the shutter speed is high be larger than that to be allocated to drive the rear curtain when the shutter speed is low.

(11)
The power controller according to (10), wherein
the power amount setting unit
sets the front curtain and the rear curtain to be mechanical shutters and the camera shake correction by the camera shake correction driving unit not to be performed when the shutter speed is medium, and
makes an amount of power to be allocated to drive the mechanical shutter when the shutter speed is medium be larger than that to be allocated to drive the mechanical shutter when the shutter speed is low.

(12)
The power controller according to (11), wherein
the amount of power to be allocated to drive the rear curtain when the shutter speed is high is larger than that to be allocated to drive the rear curtain when the shutter speed is medium.

(13)
A power control method comprising steps of:
controlling a shutter driving unit for driving a shutter;
controlling a camera shake correction driving unit; and
setting amounts of power to be allocated to the shutter driving unit and the camera shake correction driving unit according to a set shutter speed.

(14)
A non-transitory computer-readable storage medium storing a program for causing a computer to execute processing including steps of:
controlling a shutter driving unit for driving a shutter;
controlling a camera shake correction driving unit; and
setting amounts of power to be allocated to the shutter driving unit and the camera shake correction driving unit according to a set shutter speed.

REFERENCE SIGNS LIST

10 Image pickup device
21 Power supply unit
22 DC-DC converter
23 Shutter driver
24 Shutter driving unit
25 Controller
26 Image sensor
27 DC-DC converter
28 Camera shake correction driver
29 Correction driver
100 Image pickup device
121 Power supply unit
122 DC-DC converter
123 Shutter driver
124-1 Front curtain driving unit
124-2 Rear curtain driving unit
125 Controller
126 Image sensor
127 DC-DC converter
128 Camera shake correction driver
129-1 Pitch driving unit
129-2 Yaw driving unit
129-3 Roll driving unit

The invention claimed is:
1. A power controller, comprising:
a shutter controller configured to control a shutter driving unit, wherein the shutter driving unit is configured to control a shutter, wherein the shutter includes a rear curtain; and
a camera shake correction controller configured to control a camera shake correction driving unit; and
circuitry configured to:
detect an exposure of an image sensor;
set a shutter speed based the detected exposure;
allocate a first amount of power to the shutter driving unit and a second amount of power to the camera shake correction driving unit, wherein the allocation of the first amount of power and the second amount of power is based on the shutter speed; and allocate the first amount of power to drive the rear curtain based on the shutter speed.

2. The power controller according to claim 1, wherein the circuitry is further configured to:
reduce the allocated second amount of power to the camera shake correction driving unit based on the shutter speed that is faster than a determined speed;
supply the reduced second amount of power to the shutter driving unit; and
allocate the second amount of power to the camera shake correction driving unit based on the shutter speed that is equal to or less than the determined speed.

3. The power controller according to claim 1, wherein the circuitry is further configured to:
allocate a minimum amount of power from the second amount of power necessary to maintain a state of the camera shake correction driving unit based on the shutter speed faster than a determined speed.

4. The power controller according to claim 1, wherein the circuitry is further configured to change a voltage applied to the shutter driving unit based on the shutter speed.

5. The power controller according to claim 1, wherein the circuitry is further configured to
increase a voltage applied to the shutter driving unit based on the shutter speed that is higher than a determined speed.

6. The power controller according to claim 1, wherein the shutter is a focal plane shutter.

7. The power controller according to claim 1, wherein the shutter further includes a front curtain.

8. The power controller according to claim 1, wherein the shutter speed is one of ½000 seconds, ¼000 seconds, or ⅛000 seconds.

9. The power controller according to claim 7, wherein the front curtain of the shutter is one of an electronic shutter or a mechanical shutter, and the rear curtain is a mechanical shutter.

10. The power controller according to claim 7, wherein the circuitry is further configured to
set the front curtain and the rear curtain as mechanical shutters, wherein the camera shake correction driving unit is further configured to execute camera shake correction based on the shutter speed that is less than or equal to a determined speed, and
wherein the circuitry is further configured to:
set the front curtain as an electronic shutter and the rear curtain as a mechanical shutter based on the shutter speed that is faster than the determined speed; and
allocate the first amount of power to the rear curtain based on the shutter speed that is faster than the determined speed.

11. The power controller according to claim 9, wherein
in a case the front curtain is the electronic shutter, the circuitry is configured to add a third amount of power to the rear curtain based on the shutter speed that is faster than a determined speed, and
the front curtain of the shutter is set as the mechanical shutter based on the shutter speed that is equal to or less than the determined speed.

12. The power controller according to claim 10, wherein the circuitry is further configured to:
set the front curtain and the rear curtain as the mechanical shutters based on the shutter speed that is equal to the determined speed, and
allocate the first amount of power to the rear curtain based on the shutter speed that is equal to the determined speed.

13. The power controller according to claim 12, wherein
the first amount of power allocated to the rear curtain based on the shutter speed that is higher than the determined speed is larger than the first amount of power allocated to the rear curtain based on the shutter speed that is equal to the determined speed.

14. A power control method, comprising:
controlling a shutter driving unit for driving a shutter, wherein the shutter includes a rear curtain;
controlling a camera shake correction driving unit;
detecting an exposure of an image sensor;
setting a shutter speed based on the detected exposure;
allocating a first amount of power to the shutter driving unit and a second amount of power to the camera shake correction driving unit, wherein the allocation of the first amount of power and the second amount of power is based on the shutter speed; and
allocating the first amount of power to drive the rear curtain based on the shutter speed.

15. A non-transitory computer-readable storage medium having stored thereon, computer executable instructions, which when executed by a processor, cause the processor to execute operations, the operations comprising:
controlling a shutter driving unit for driving a shutter, wherein the shutter includes a rear curtain;
controlling a camera shake correction driving unit;
detecting an exposure of an image sensor;
setting a shutter speed based on the detected exposure;
allocating a first amount of power to the shutter driving unit and a second amount of power to the camera shake correction driving unit, wherein the allocation of the first amount of power and the second amount of power is based on the shutter speed; and
allocating the first amount of power to drive the rear curtain based on the shutter speed.

* * * * *